(12) United States Patent
Wei et al.

(10) Patent No.: US 6,289,101 B1
(45) Date of Patent: Sep. 11, 2001

(54) TELEPHONE RECEIVER HAVING A HOLLOW PORTION

(76) Inventors: Oscar Wei, 7F-2, No. 7, Ching Hua St., Wen Shan District, Taipei; Chin-Shui Hung, 1F, No. 253, Hu Lin St., Hsin I District, Taipei, both of (TW)

( * ) Notice: Subject to any disclaimer, the term of this patent is extended or adjusted under 35 U.S.C. 154(b) by 0 days.

(21) Appl. No.: 09/373,999

(22) Filed: Aug. 16, 1999

(51) Int. Cl.⁷ ........................................... H04M 1/00
(52) U.S. Cl. ................................................. 379/433
(58) Field of Search .................... 379/433, 420, 379/428; 381/332, 334, 386, 395, 398, 399, 400, 413

(56) References Cited

U.S. PATENT DOCUMENTS

| | | | |
|---|---|---|---|
| 4,163,875 | * | 8/1979 | Cogan ................................. 379/433 |
| 5,058,154 | * | 10/1991 | Anderson ............................ 379/433 |
| 5,195,142 | * | 3/1993 | D'Avolio et al. ................... 379/433 |

* cited by examiner

*Primary Examiner*—Jack Chiang
(74) *Attorney, Agent, or Firm*—Bacon & Thomas, PLLC

(57) ABSTRACT

A hollow telephone receiver comprises a body, a vibrating diaphragm, a coil, a front piece, a magnet, a yoke, a sound adjusting cloth and a terminal plate. The vibrating diaphragm, coil, front piece, magnet, yoke, sound adjusting cloth and the terminal plate are placed into the body sequentially. Thus, the coil winds the cylinder at the lower end of the yoke and is located within the front piece and the magnet. While the upper circular hole at the upper end of the yoke is adhered with the sound adjusting cloth and the terminal plate so that after a hollow telephone receiver is assembled, a hollow portion is formed at the center thereof. Therefore, as a sound is expanded and compressed by the vibration of the vibrating diaphragm. The amplitude of the sound wave will complete concentrate at the hollow portion and is collected at the lower portion of the cylinder of the yoke. Moreover, by the S pole and N pole at the upper and lower ends of the magnet, the magnetic strength is increased effectively so as to enhance a current. Since the sound is amplified by passing through the hollow portion, a steadier audio response is obtained.

3 Claims, 5 Drawing Sheets

TELEPHONE RECEIVER HAVING A HOLLOW PORTION

FIELD OF THE INVENTION

The present invention relates to a telephone receiver, and especially to a telephone receiver having a hollow portion, by the sound wave passing through the hollow portion and the excitation of the magnet, the amplitude of sound is amplified and a steadier frequency response is achieved.

BACKGROUND OF THE INVENTION

As shown in FIG. 1, a conventional telephone receiver is illustrated. The receiver is formed by a body 10, a yoke 20, a coil 30, a vibrating diaphragm 40, a front cover 50, and a rear cover 60. The outer side of the yoke 20 is circularly installed with a magnet 70. A circular iron piece 80 is attracted at the upper end of the magnet 70. The bottom of vent hole of the yoke 20 is adhered with a sound adjusting cloth 90 made of non-weaving cloth. In the prior telephone receiver, the body 10 and the rear cover 60 forms with a tightly sealed space so as to be connected to the sound adjusting cloth 90 to form a damp of the vibrating diaphragm. Thus, the prior art receiver may conform to the characteristic of the frequency response of a telephone receiver. However, in the aforesaid prior art telephone receiver, a rear cover 60 is necessary for being formed with a closing space. If the sealing of the closing space is not preferred in assembling, then a preferred frequency response can not be obtained. Whereas the assembly of the rear cover 60 is not convenient and complicated. Moreover, the rear cover 60 will increase the width of the receiver. Where it is used in a mobile phone or a super thin telephone (such as CT2), a bottleneck is induced due to the volume of the receiver can not be further reduced. This is a big problem in the conventional telephone receiver.

A frequency response of a conventional telephone receiver is shown in FIG. 5, wherein the effective bandwidth is ranged between 400 Hz~1.5 KHz. Thus the bandwidth is too narrow to generate a clear sound.

SUMMARY OF THE INVENTION

Accordingly, the primary object of the present invention is to provide a hollow telephone receiver comprising a body, a vibrating diaphragm, a coil, a front piece, a magnet, a yoke, a sound adjusting cloth and a terminal plate. The vibrating diaphragm, coil, front piece, magnet, yoke, sound adjusting cloth and the terminal plate are placed into the body sequentially. Thus, the coil winds the cylinder at the lower end of the yoke and is located within the front piece and the magnet. While the upper circular hole at the upper end of the yoke is adhered with the sound adjusting cloth and the terminal plate so that after a hollow telephone receiver is assembled, a hollow portion is formed at the center thereof. Therefore, as a sound is expanded and compressed by the vibration of the vibrating diaphragm. The amplitude of the sound wave will complete concentrate at the hollow portion and is collected at the lower portion of the cylinder of the yoke. Moreover, by the S pole and N pole at the upper and lower ends of the magnet, the magnetic strength is increased effectively so as to enhance the current. Since the sound is amplified by passing through the hollow portion, a steadier audio response is obtained.

The various objects and advantages of the present invention will be more readily understood from the following detailed description when read in conjunction with the appended drawing.

DETAILED DESCRIPTION OF THE PREFERRED EMBODIMENTS

Figure 1:
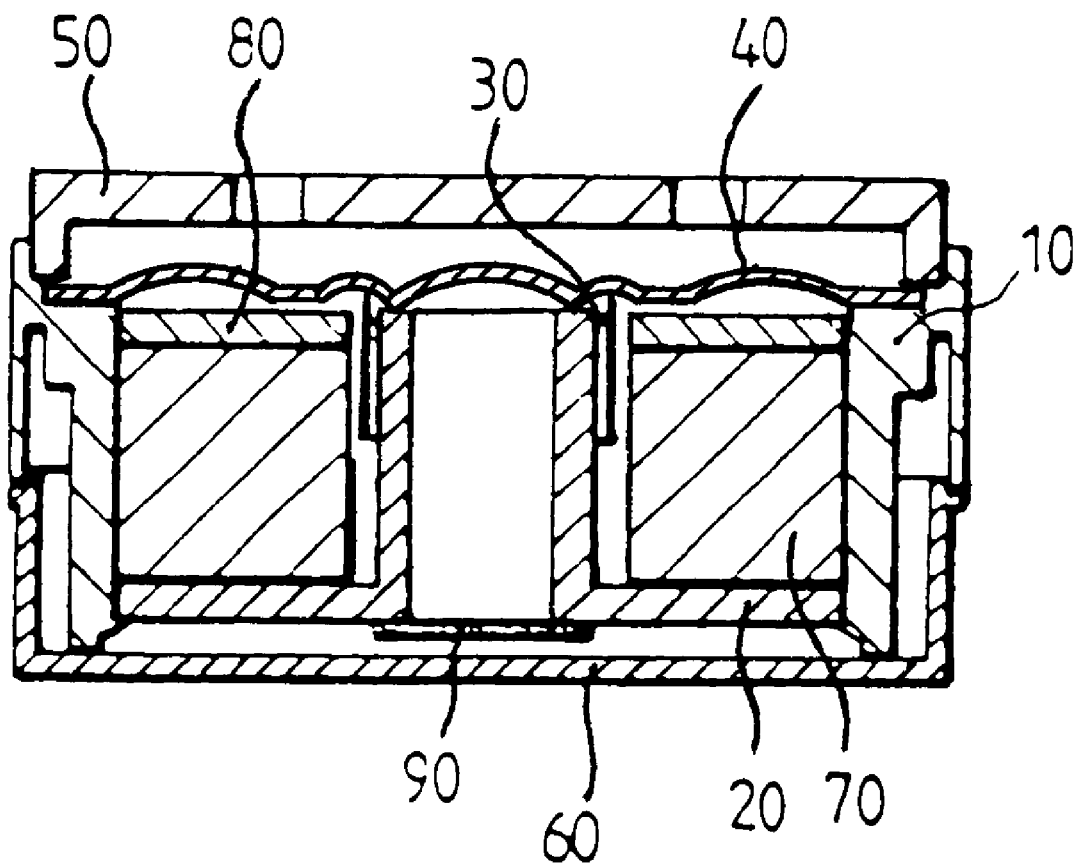
FIG. 1 shows a cross sectional view of a prior art telephone receiver.
Figure 2:
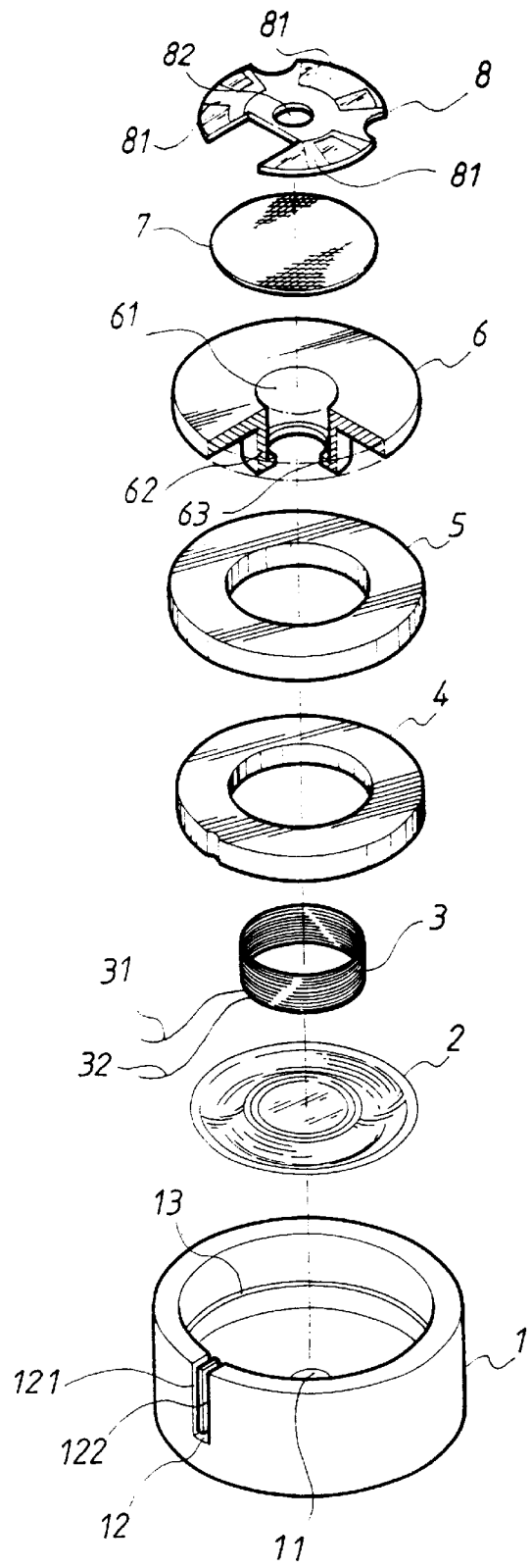
FIG. 2 is an exploded perspective view of the present invention.
Figure 3:
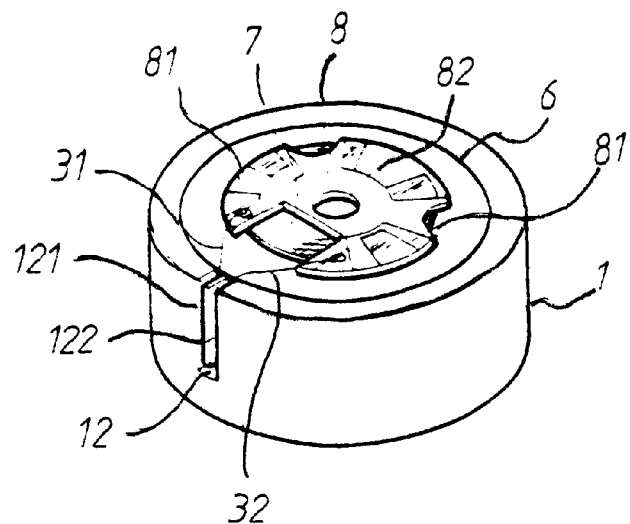
FIG. 3 is an assembled perspective view of the present invention.
Figure 4:
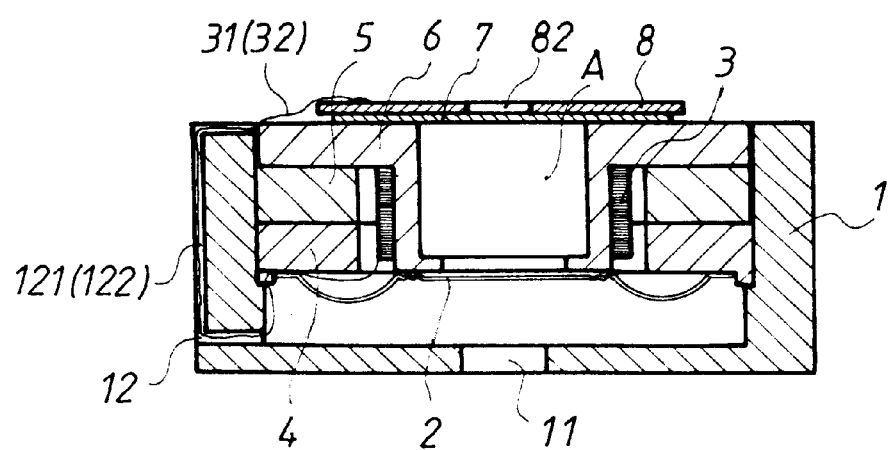
FIG. 4 is an assembled cross sectional view of the present invention.
Figure 5:
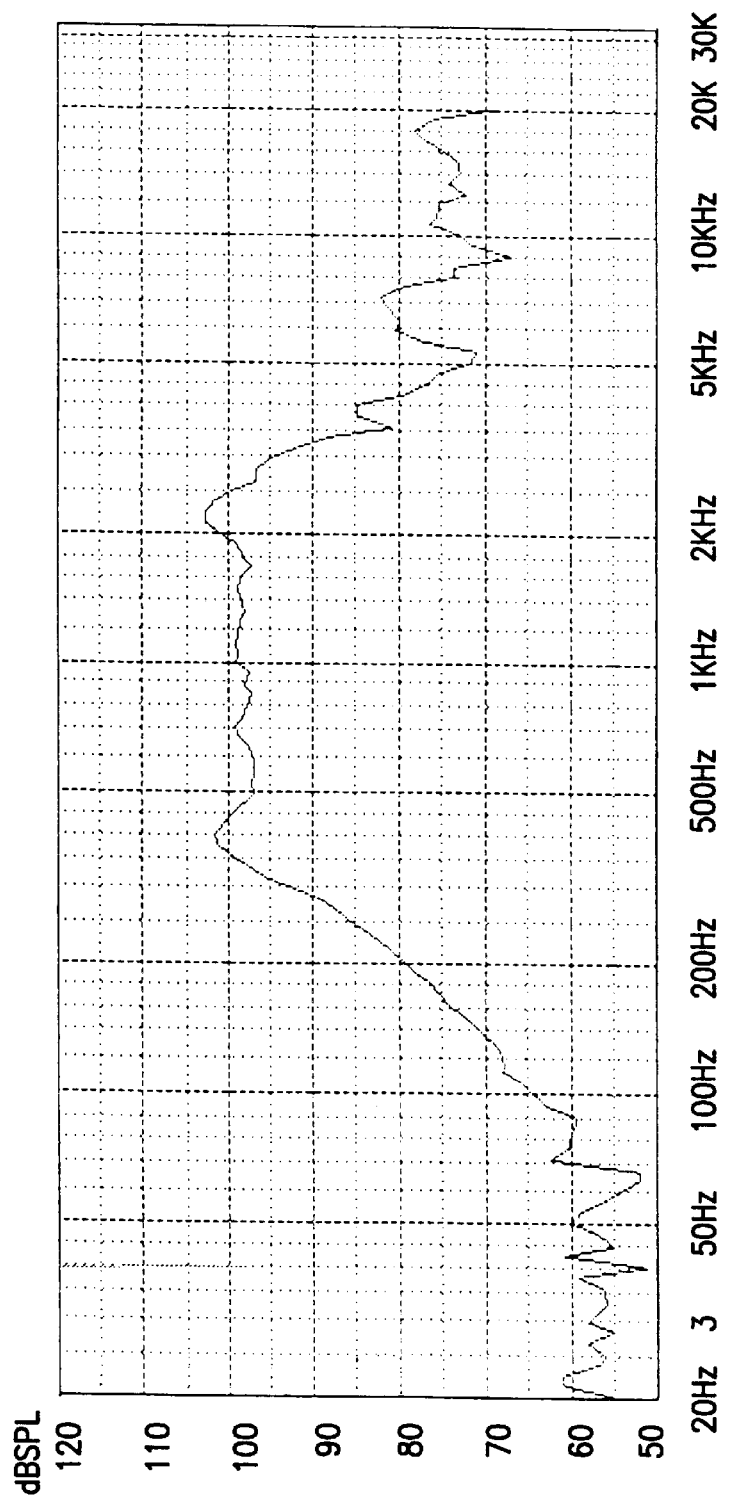
FIG. 5 shows the frequency response of a prior art telephone receiver.

With reference to FIG. 2~4, the hollow telephone receiver of the present invention includes a body 1, a vibrating diaphragm 2, a coil 3, a front piece 4, a magnet 5, a yoke 6, a sound adjusting cloth 7 and a terminal plate 8 and other components.

The body 1 is an insulated circular cover. The sealed end thereof has a middle hole 11. A through hole 12 is formed on the wall portion. The through hole 12 can be installed with two grooves 121 and 122. A staged circular surface 13 is formed on the inner wall of the body.

The vibrating diaphragm 2 is a transparent diaphragm with a proper circular wave shape. By the vibration of the vibrating diaphragm 2 between a loosing state and a tighten state, a stimulated current is generated.

The coil 3 is formed by winding a wire and is installed on the vibrating diaphragm 2.

The front piece 4 is a circular piece and is a staged circular surface firmly installed to the inner wall of the body 1. Two beams of wires 31 and 32 passes through the through hole 12, and then may wind along the grooves 121 and 122 for being welded to the conductive foil 81 on the surface of the terminal plate 8.

The magnet 5 is a circular piece identical to the aforesaid front piece 4 and is attracted to the upper end of the front piece 4 so that the coil 3 is located in the inner circular hole of the front piece 4 and the magnet 5.

The yoke 6 is a circular body with a cross section of T shape. The lower end of the central circular hole 61 has a cylinder 62 extended downwards. The opening at the distal end of the cylinder 62 is formed as an inward reduced staged circular rim 63 so that the coil 3 winds the cylinder 62 at the outer wall of lower end of the yoke 6, while a proper gap is formed between the inner circular holes of the front piece 4 and the magnet 5.

The sound adjusting cloth 7 is made of non-weaving cloth or paper material and serves to be adhered to the central hole 61 of the yoke 6.

The terminal plate 8 is installed on the sound adjusting cloth 7 and a plurality of conductive foil 7 is installed at the surface thereof, and the central portion of the terminal plate 8 is installed with a central hole 82.

By the aforesaid structure, the vibrating diaphragm 2, coil 3, front piece 4, magnet 5, yoke 6, sound adjusting cloth 7 and terminal plate 8 are placed into the body 1 sequentially. Thus, the coil 3 winds the cylinder 62 at the lower end of the yoke 6 and is located within the front piece 4 and the magnet 5. While the upper circular hole at the upper end of the yoke 6 is adhered to the sound adjusting cloth 7 and the terminal plate 8 so that after the hollow telephone receiver is assembled, a hollow portion A is formed at the center thereof. Therefore, as a sound is expanded and compressed by the vibration of the vibrating diaphragm, the amplitude of the sound wave will complete concentrate at the hollow portion and is collected at the lower cylinder 62 of the yoke 6. Moreover, by the S pole and N pole at the upper and lower ends of the magnet 5, the magnetic strength is increased effectively so as to increase a current. Since the sound may be amplified by passing through the hollow portion A, a steadier audio response is obtained.

Figure 6:
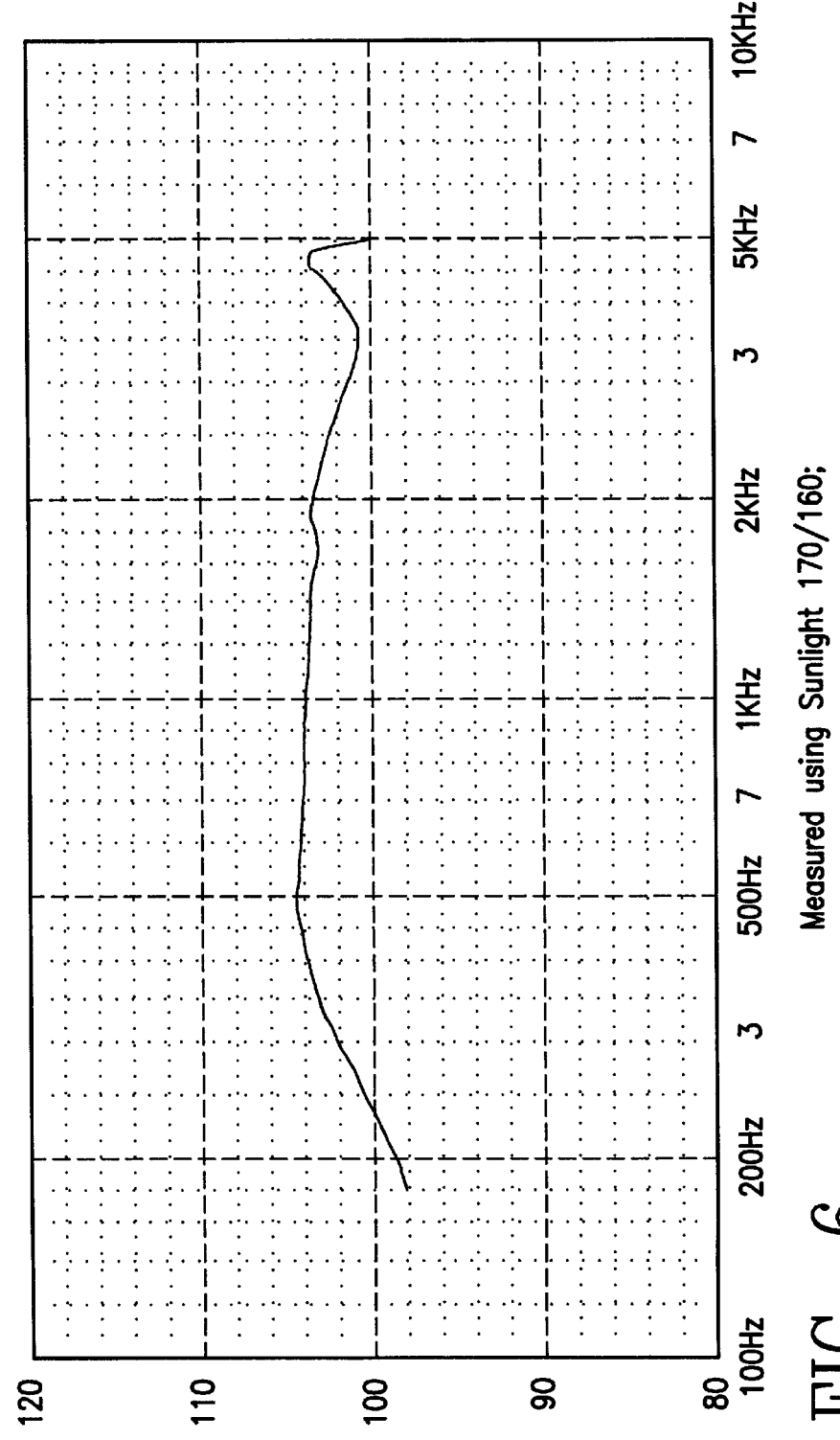
FIG. 6 is a frequency response of the present invention.

Experiments of the present invention have been performed by the inventor as shown in FIG. 6. At 300 Hz, a frequency response of 100 DB may be achieved. Thus, the present invention conforms completely to the standard of the frequency response of a telephone receiver. Moreover, the frequency response of 300 Hz~5 KHz is also flat. Therefore, in the present invention, by forming a hollow center portion, the amplitude of sound is amplified so that a clear sound is generated.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A telephone receiver having a hollow portion comprising a body, a vibrating diaphragm, a coil, a front piece, a magnet, a yoke, a sound adjusting cloth and a terminal plate, characterized in that:

the body is an insulated circular cover, a sealed end thereof have a middle hole, a through hole is formed on a wall portion and a staged circular surface is formed on an inner wall of the body;

the vibrating diaphragm is a transparent diaphragm with a proper circular wave shape;

the coil is formed by winding a wire and is installed on the vibrating diaphragm;

the front piece is a circular piece and is a staged circular surface firmly installed to the inner wall of the body, two beams of wires and passes through from the through hole for being welded to a conductive foil on a surface of the terminal plate;

the magnet is a circular piece identical to the front piece and is attracted to the upper end of the front piece so that the coil is located in the inner circular hole of the front piece and the magnet;

the yoke is a circular body with a cross section of T shape, the lower end of the central circular hole has a cylinder extended downwards, the opening at the distal end of the cylinder is formed as an inward reduced staged circular rim so that the coil winds the cylinder at the outer wall of lower end of the yoke;

the sound adjusting cloth is made of non-weaving cloth or paper material and serves to be adhered to the central hole of the yoke;

the terminal plate is installed on the sound adjusting cloth and a plurality of conductive foil is installed at the surface thereof, and the central portion of the terminal plate is installed with a central hole; wherein by the aforesaid structure, the vibrating diaphragm, coil, front piece, magnet, yoke, sound adjusting cloth and the terminal plate are placed into the body sequentially, thus, the coil winds the cylinder at the lower end of the yoke and is located within the front piece and the magnet, while the upper circular hole at the upper end of the yoke is adhered with the sound adjusting cloth and the terminal plate so that after a hollow telephone receiver is assembled, a hollow portion is formed at the center thereof, therefore, as a sound is expanded and compressed by the vibration of the vibrating diaphragm, the amplitude of the sound wave will complete concentrate at the hollow portion and is collected at the lower portion of the cylinder of the yoke, moreover, by the S pole and N pole at the upper and lower ends of the magnet, the magnetic strength is increased effectively, since the sound is amplified by passing through the hollow portion, a steadier audio response is obtained.

2. The telephone receiver having a hollow portion as claimed in claim 1, wherein the through hole have two grooves along a wall of the body, and two beams of wires and passes through from the through hole, and then wind along the grooves and for being welded to a conductive foil on a surface of the terminal plate.

3. The telephone receiver having a hollow portion as claimed in claim 1, wherein proper gaps are formed between the coil and the inner circular hole of the front piece, and between the coil and the inner circular hole of the magnet.

* * * * *